United States Patent [19]

Schrape et al.

[11] 4,018,320
[45] Apr. 19, 1977

[54] CLUTCH DISK FOR MOTOR VEHICLE MAIN CLUTCHES

[75] Inventors: Peter Schrape, Stuttgart; Günter Wörner, Rommelshausen, both of Germany

[73] Assignee: Daimler-Benz Aktiengesellschaft, Germany

[22] Filed: Sept. 25, 1974

[21] Appl. No.: 509,134

[30] Foreign Application Priority Data

Oct. 6, 1973 Germany ............... 2350279

[52] U.S. Cl. .................. 192/106.2; 64/27 C
[51] Int. Cl.² ............. F16D 69/00; F16D 3/14
[58] Field of Search ......... 192/106.2, 106.1, 30 V, 192/70.17, 70.18; 64/27 F, 27 C

[56] References Cited

UNITED STATES PATENTS

| | | | |
|---|---|---|---|
| 2,291,405 | 7/1942 | Nutt | 192/106.2 |
| 2,571,291 | 10/1951 | Reed | 192/106.2 X |
| 2,613,515 | 10/1952 | Crutchley | 192/106.2 X |
| 3,578,121 | 5/1971 | Maurice | 192/106.2 |
| 3,762,521 | 10/1973 | Dotter | 192/106.2 |
| 3,802,541 | 4/1974 | Schneider | 192/106.2 X |
| 3,863,747 | 2/1975 | Werner et al. | 192/106.2 |

*Primary Examiner*—Samuel Scott
*Assistant Examiner*—Lance W. Chandler
*Attorney, Agent, or Firm*—Craig & Antonelli

[57] ABSTRACT

A clutch disk for motor vehicle main clutches, in which a disk member carrying the friction linings is torsionally elastically connected with a hub member, and in which several separate springs or spring sets with separate damping characteristics are provided; the springs or spring sets are thereby retained in windows provided in one of the two parts which are torsionally elastically connected with each other while the start of operation of at least one of the damping devices is determined by a sheet metal control member; a separate prestressed control spring is thereby coordinated to the control member.

13 Claims, 3 Drawing Figures

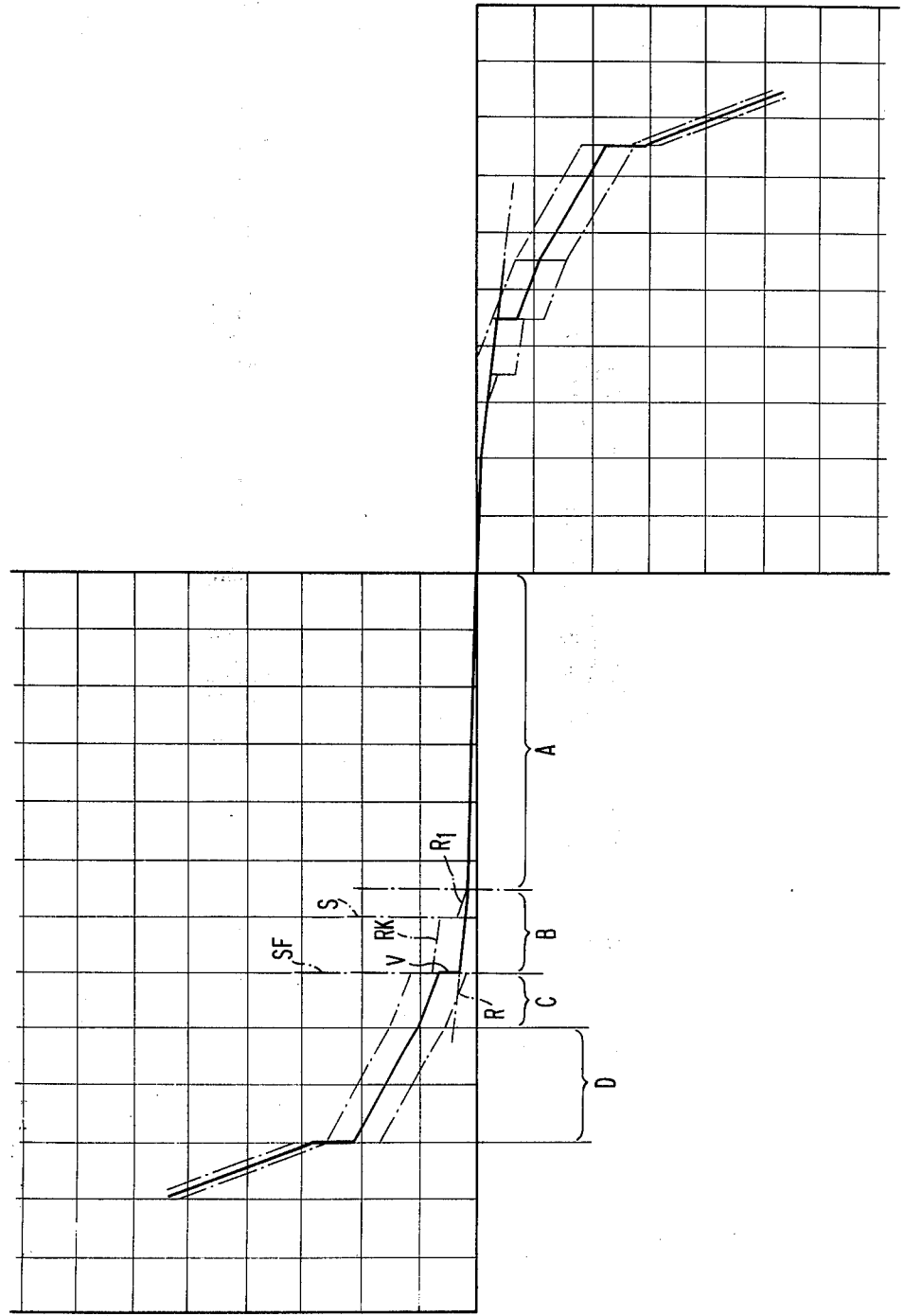

CLUTCH DISK FOR MOTOR VEHICLE MAIN CLUTCHES

The present invention relates to a clutch disk for motor vehicle main clutches, in which a disk member carrying the friction linings is torsionally elastically connected with a hub member, and in which several separate springs or spring sets with separate damping devices are provided, whereby the springs or spring sets are retained in windows of one of the two parts torsionally elastically connected with each other and the start of operation of at least one damping device is determined by a sheet metal control member which engages with tabs or the like in the corresponding windows or abuts at the corresponding spring.

With clutch disks of the aforementioned type, for example, according to German OS 1,600,194, the plate-like sheet metal control member cooperates with the normal springs of the various stages. The disadvantage now results therefrom that frequently the friction damping becomes effective in only one direction, for example, during the forward vibration or oscillation whereas it does not become effective in contrast thereto, during the backward vibration or oscillation. This resides in the fact that the sheet metal control member is retained in its end position by the friction force of the respective damping device and the damping therefore cannot become effective any longer in the other direction. If one were to consider this, then an influencing of the springs of the different stages would result.

The present invention is now concerned with the task to avoid the described disadvantage, i.e., a clutch disk is to be provided in which the sheet metal control member can be reliably guided back or returned. The underlying problems are solved according to the present invention in the aforementioned clutch disks in that a separate prestressed control spring is coordinated to the sheet metal control member. It is possible in this manner that the sheet metal control member is brought back with certainty up to completely into its center position, i.e., the friction device becomes effective to the same extent or equally in both directions. The place of the characteristic curve at which the sheet metal control member is fully functioning is determined exclusively by the equilibrium of the control spring force and the friction force. The dimension and construction of the control spring is now independent of the springs of the different stages which can be dimensioned and constructed exclusively according to the desired stage characteristics. In some cases, the control spring may also partake under certain circumstances in shaping the characteristic curve, i.e., it could be installed with a high spring stiffness having a partial prestress. The lost travel during which the sheet metal control member is not pulled back, would then be relatively short. Accordingly, a further development of the inventive concept resides in that the control spring is prestressed to a force which is smaller than the friction force prevailing in the corresponding range.

It should be pointed out in that connection that the inventive concept is, of course, applicable also in clutch disks with several control members. Furthermore, it is without any significance whether one operates with a so-called "advanced damping" or without the same.

Accordingly, it is an object of the present invention to provide a clutch disk for motor vehicle main clutches which avoids by simple means the aforementioned shortcomings and drawbacks encountered in the prior art.

Another object of the present invention resides in a clutch disk for motor vehicle main clutches in which the friction damping becomes effective in both directions of rotation.

A further object of the present invention resides in a clutch disk for motor vehicle main clutches in which the control member is returned with certainty.

Still another object of the present invention resides in a clutch disk of the aformentioned type in which the sheet metal control member is returned with certainty up to completely into the center position while the choice of the control spring is now independent of the springs forming the various spring stages.

These and other objects, features and advantages of the present invention will become more apparent from the following description when taken in connection with the accompanying drawing which shows, for purposes of illustration only, one embodiment in accordance with the present invention, and wherein:

FIG. 3 is a diagram explaining the mode of operation of the clutch disk in accordance with the present invention.

Figure 1:
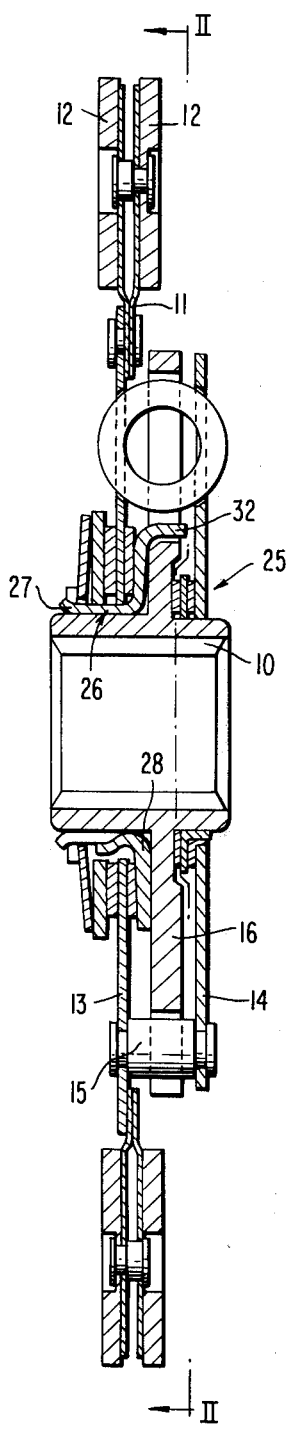
FIG. 1 is a cross-sectional view through a clutch disk, taken along line I—I of FIG. 2.
Figure 2:
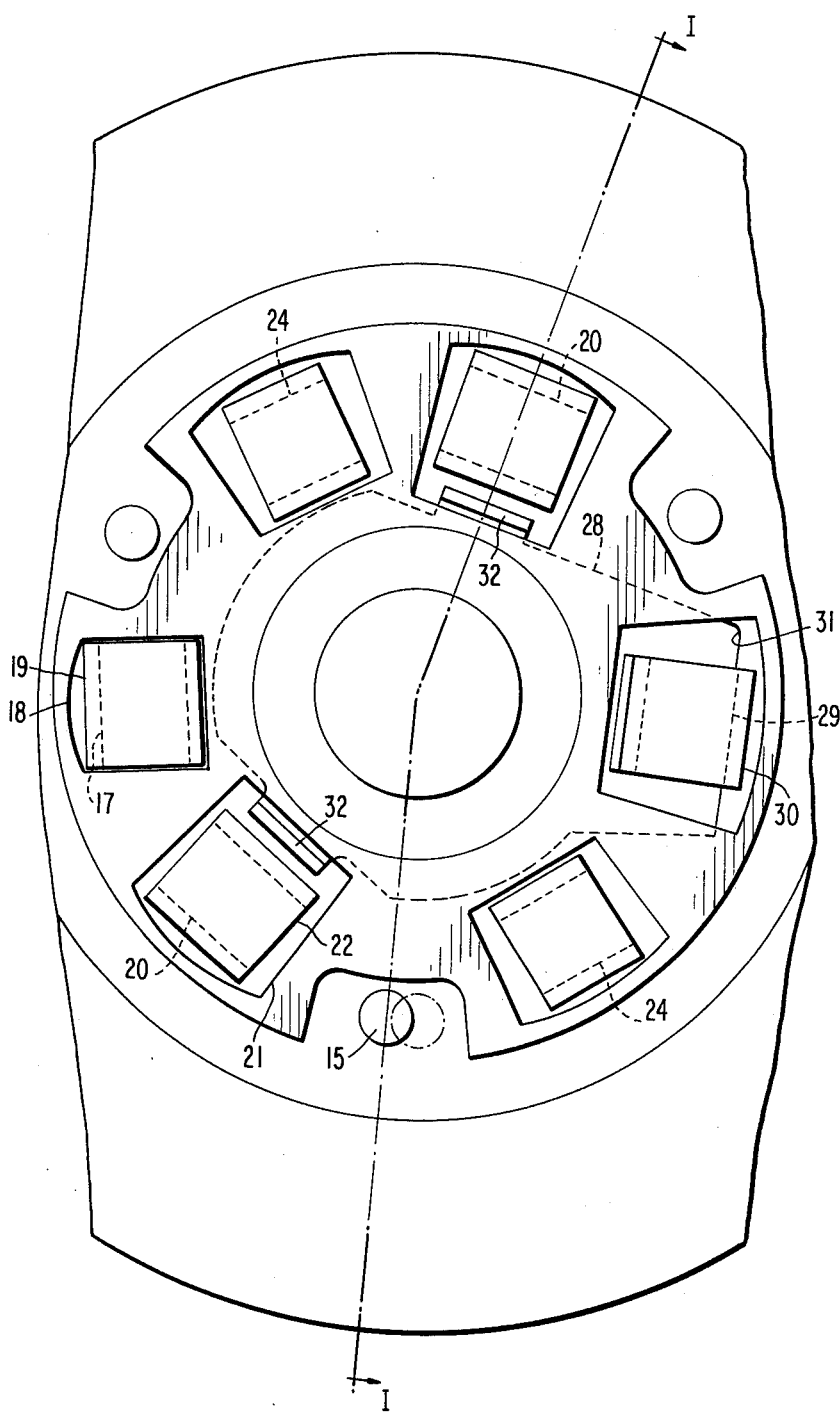
FIG. 2 is a cross-sectional view taken along line II—II of FIG. 1, in simplified representation.

Referring now to the drawing wherein like reference numerals are used throughout the various views to designate like parts, according to FIGS. 1 and 2, the clutch disk consists in the usual manner of a hub member 10 and of a disk member 11 which carries the friction linings 12. The disk member 11 is operatively connected with the two lateral sheet metal members 13 and 14 which, in their turn, are operatively connected with each other for rotation in unison by the bolts 15. The hub member 10 includes a flange 16 which is disposed between the two lateral sheet metal members 13 and 14.

Several springs or spring packages are provided for the torsionally elastic connection between the disk member 11 and the hub member 10. Thus, as shown in FIG. 2, the first stage is formed by a spring 17 which is arranged in the windows 18 of the flange 16 and in the windows 19 of the lateral sheet metal members 13 and 14; the windows 18 and 19 thereby have the same dimension in the circumferential direction. Analogously, the same arrangement is also made for the second stage for which, however, two spring 20 are provided. Of course, corresponding to the later starting point of operation, the windows 21 in the flange 16 are thereby larger in the circumferential direction that the windows 22 in the lateral sheet metal members 13 and 14. The same also is true analogously for the third stage whereby again two springs 24 are provided.

According to FIG. 1, two damping devices are coordinated to the clutch disk 11, which become effective separately from one another. The first damping device generally designated by reference numeral 25 is arranged on the hub member 10 and acts between the flange 16 and the lateral sheet metal member 14. Its construction may be in detail of any desired, conventional type. It takes over the damping in the first and partly also in the second spring stage. A further damping device generally designated by reference numeral 26 is arranged on the hub member 27 of a sheet metal control member 28 which also determines the starting point of operation of this damping device 26. This damping device 26 acts between the sheet metal control member 28 and the lateral sheet metal member 13. The construction of the damping device 26 itself may again be of any suitable, conventional type.

A separate control spring 29 is now coordinated to the sheet metal control member 28—see in connection therewith FIG. 2—which is arranged in a window 30 of the lateral sheet metal members 13 and 14. This control spring 29 is accurately surrounded by arms 31 provided at the sheet metal control member 28. It is inserted into the corresponding window 30 under prestress. The control member 28 engages additionally by means of tabs 32 into the windows 21 of the second spring stage. By a corresponding play advance between these tabs 32 and the lateral window edges, one may also attain a so-called "advanced damping".

The operation will be explained by reference to the diagram of FIG. 3. Within a range A, at first only the first spring stage with the spring 17 and the friction device 25 are operative. The damping of the idling vibrations of the engine are achieved in this range. Within the range B, the second spring stage with the springs 20 becomes operable whereby initially the first damping device 25 is maintained. Since, however, the tabs 32 of the sheet metal control member 28 are constructed with a predetermined play or clearance with respect to the corresponding windows, the second damping device 26 starts to operate already after a slight angle of rotation at the point S. Since, however, at this point the second spring stage remains preserved, one speaks of a so-called advanced damping. At the point SF the effectiveness of the control spring 29 now starts which is added to the springs of the second stage. Within the range C, the springs of the second stage cooperate therefore with the control spring 29, i.e., they act together. The control spring 29 thereby has a prestress which is illustrated in FIG. 3 by the straight line portion V. This prestress is smaller than the friction force occurring in this range, which is illustrated by the line portion RK in FIG. 3. Since, however, the place of the characteristic curve, at which the sheet metal control member 28 becomes fully effective, is determined by the equilibrium of friction force and control spring force, the sheet metal control member 28 cannot be completely returned or brought back. A residual damping results which holds fast the control member 28 and which is illustrated by the pressure R. This residual damping is again introduced during forward movement —illustrated by $R_1$. Within the range D, the third spring stage with the springs 24 then becomes effective whereby the damping device 26 is maintained.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. In a clutch disk arrangement for motor vehicle main clutches which includes a hub means, friction lining means, a disk means for carrying said friction lining means, means for torsionally elastically connecting said disk means with said hub means including a plurality of spring means having different spring characteristics for producing a multi-stage operation of the clutch disk arrangement, a plurality of window means for respectively accommodating said spring means, separate damping means for damping said plurality of spring means, and control means for controlling the start of operation of at least one damping means, the improvement comprising: said control means including a means for engaging a window means accommodating the spring means for producing a second stage of the multi-stage operation, a separate control spring coordinated to the control means, said separate control spring being mounted in said control means and being prestressed to a predetermined spring force in excess of the force necessary to maintain said control spring in said control means such that the point at which said control means is fully effective is determined exclusively by an equilibrium of the force of the control spring and a friction force effective within an operating stage of the clutch disk arrangement during which said control means is effective.

2. A clutch disk arrangement according to claim 1, wherein said predetermined spring force is smaller than the friction force prevailing within the stage of operation of the clutch disk arrangement during which said control means is effective.

3. A clutch disk arrangement according to claim 2, whrein said control means is a sheet metal control member.

4. A clutch disk arrangement according to claim 3, wherein said engaging means includes at least one tab-like portion.

5. A clutch disk arrangement according to claim 3, wherein said sheet metal control member abuts at at least one of said spring means.

6. A clutch disk arrangement according to claim 1, wherein said control means is a sheet metal control member.

7. A clutch disk arrangement according to claim 6, wherein said engaging means includes at least one tab-like portion.

8. A clutch disk arrangement according to claim 6, wherein said sheet metal control member abuts at at least one of the spring means.

9. A clutch disk arrangement according to claim 1, wherein the clutch disk arrangement has at least three stages of operation.

10. A clutch disk arrangement according to claim 9, wherein at least two spring means produce the second stage of the at least three stages of operation, said at least two spring means being accommodated in separate spaced window means, and wherein said engaging means of said control means engage in each of said spaced window means.

11. A clutch disk arrangement according to claim 10, wherein said engaging means includes spaced tab portions extending into the respective window means accommodating the two spring means for producing the second stage of opration of the clutch disk.

12. A clutch disk arrangement according to claim 11, wherein said tab means have a width which is less than the width of the respective window means.

13. A clutch disk arrangement according to claim 12, wherein said control means is a sheet metal control member.

* * * * *